United States Patent [19]

Kosuge

[11] Patent Number: 4,773,675

[45] Date of Patent: Sep. 27, 1988

[54] SUPPORTING FRAME FOR A FOUR WHEELED BUGGY OPERATED BY A SEATED DRIVER

[75] Inventor: Hideyoshi Kosuge, Hyogo, Japan

[73] Assignee: Kawasaki Jukogyo Kabushiki Kaisha, Japan

[21] Appl. No.: 67,954

[22] Filed: Jun. 30, 1987

[30] Foreign Application Priority Data

Jul. 3, 1986 [JP] Japan ................................ 61-102208

[51] Int. Cl.⁴ .............................................. B62D 21/00
[52] U.S. Cl. ...................................... 280/781; 180/908
[58] Field of Search ............... 180/299, 908, 215, 217, 180/210, 58, 60, 62, 295, 296; 280/281, 781, DIG. 5, 62

[56] References Cited

FOREIGN PATENT DOCUMENTS 567095 8/1958 Belgium ............................... 180/215
2559119 8/1985 France ................................ 280/781
61-66089 5/1986 Japan .

*Primary Examiner*—John J. Love
*Assistant Examiner*—Karin L. Ferriter
*Attorney, Agent, or Firm*—Leydig, Voit & Mayer

[57] ABSTRACT

A supporting frame for a driving apparatus of a four wheeled buggy having a steering wheel and operated by a seated driver, comprises an oblique frame, an engine supporting frame, a removable rear frame, a removable lower frame, and to enclose an accommodating space for a driving apparatus. The driving apparatus accommodated in accommodating space is prevented from being damaged even when the buggy runs on a severely irregular land and the driving apparatus can be removed from the buggy to facilitate maintenance of the driving apparatus.

3 Claims, 3 Drawing Sheets

SUPPORTING FRAME FOR A FOUR WHEELED BUGGY OPERATED BY A SEATED DRIVER

BACKGROUND OF THE INVENTION

1. Field of the Invention

The present invention relates to a four wheeled buggy for carrying loads over, for example, pasture, farm, or waste land and the like. More particularly, it relates to an improved vehicle frame for a driving apparatus of a four wheeled buggy having a steering wheel and operated by a seated driver.

2. Description of the Related Art

Recently, small-sized light three wheeled or four wheeled buggies have been developed as vehicles adapted to run on pasture, farm, or waste land and the like. These buggies are operated by a driver sitting on the buggy, as in the case of an auto or bike, who steers the buggy by manual operation of a handle bar. For example, such a buggy is described in the Japanese Utility Model Laid-Open No. 66089/1986.

However, the conventional buggy has disadvantages. It is hard for the driver to get on and off the buggy, and, when the buggy runs on an irregular surface, as on pasture, farm-land, waste land and the like, manipulation of the bar handle requires great effort, tiring the driver on long drives. Further, the conventional buggy has poor load carrying capacity and does not permit a double seating.

To eliminate the drawbacks of the conventional buggy, a four buggy having a steering wheel has recently been proposed. However, such a four wheeled buggy differs considerably from the conventional four wheeled buggy in construction and arrangement of the driving apparatus. In the four wheeled buggy of the present invention the driving apparatus is arranged at the near portion of the buggy and an engine connected to a differential gear for driving the rear wheels through a belt converter (stageless speed changer of a belt type) and a front-rear drive changing transmission. Further, the driving apparatus does not project below the vehicle frame thus preventing damage even when the buggy runs on irregular land.

Accordingly, an object of the present invention is to provide an improved vehicle frame for supporting a driving apparatus of a four wheeled buggy operated by a seated driver satisfies the above requirements.

SUMMARY OF THE INVENTION

To solve the above problems, according to the present invention, an improved supporting frame is provided for supporting the driving apparatus for a four wheeled buggy operated by a seated driver, comprising: an oblique frame connected a rear surface of a main frame; an engine supporting frame arranged upright on a rear portion of said main frame, extending rearwardly through a bent portion thereof and supported on said oblique frame; a rear frame removably connected to a rear portion of said engine supporting frame and depending therefrom and bent forwardly at a level equal to that of said main frame; a lower frame removably connected a front portion of said rear frame and removably connected to a lower portion of said oblique frame; these frames defining a space used for accommodating the driving apparatus.

The whole driving apparatus can be accommodated by space below the engine supporting frame in such a way that damage of the driving apparatus is prevented, even when the buggy runs on irregular land. Further, since the rear frame and the lower frame are removable, the whole driving apparatus can be removed from the vehicle, to facilitate maintenance, inspection, and repair of the driving apparatus.

DETAILED DESCRIPTION OF THE PREFERRED EMBODIMENT

Figure 1:
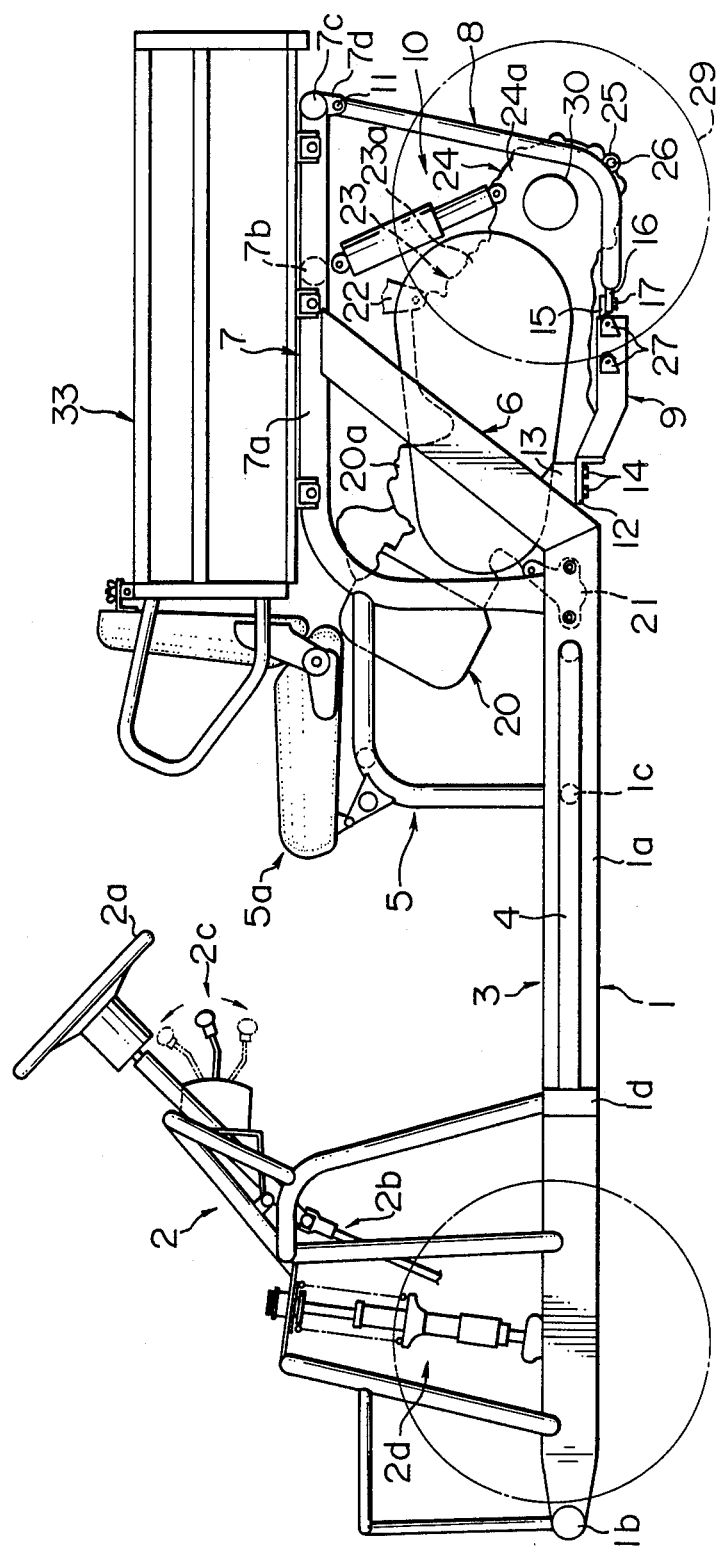
FIG. 1 is an elevation view of a four wheeled buggy incorporating a supporting frame for driving apparatus according to the present invention.
Figure 2:
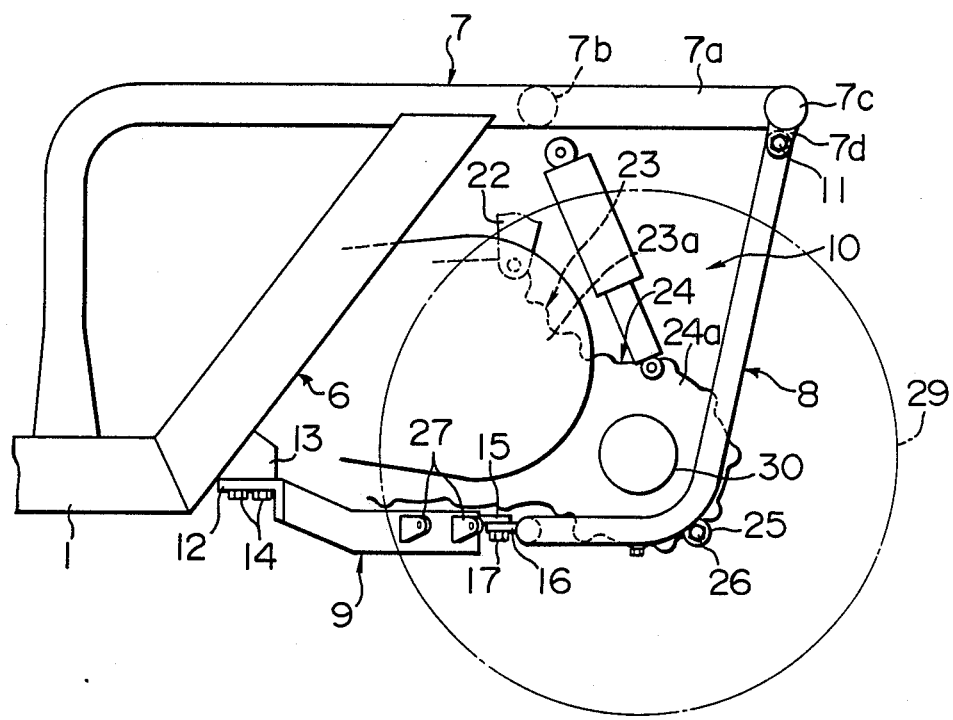
FIG. 2 is an enlarged elevational view of the supporting frame according to the present invention.
Figure 3:
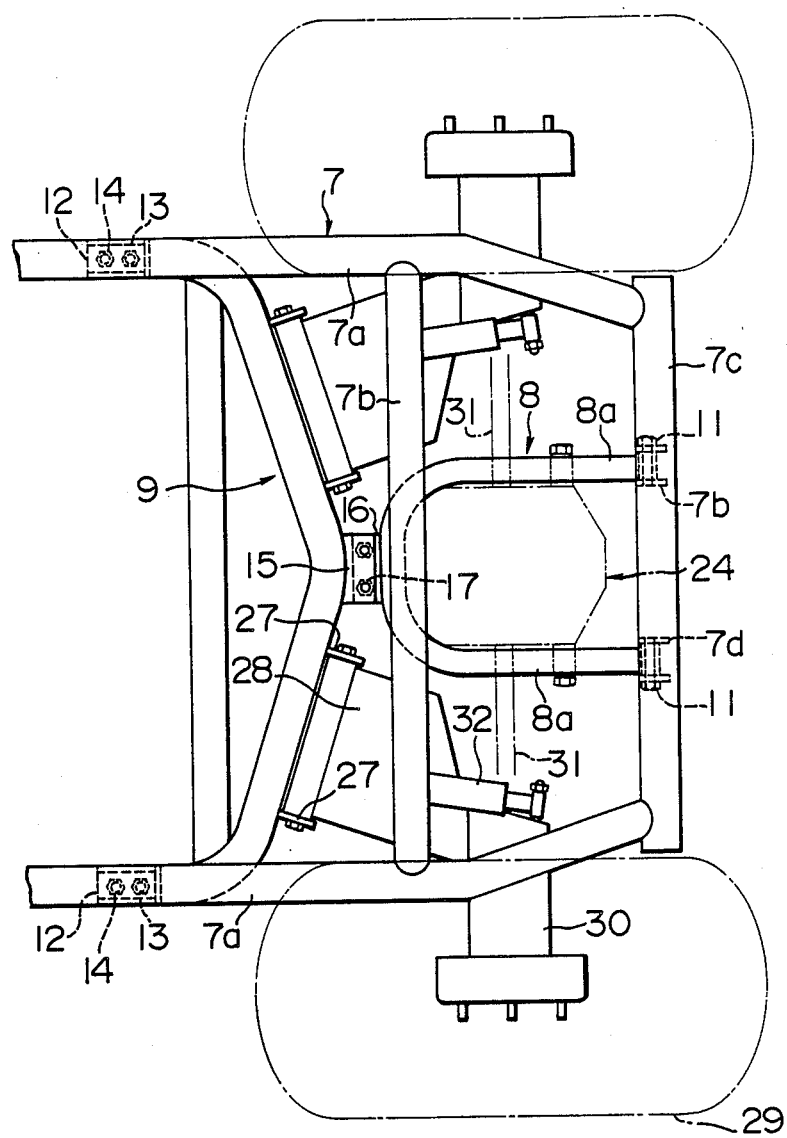
FIG. 3 is a plan view of the supporting frame shown in FIG. 2.

The present invention will now be explained with reference to the drawings. FIG. 1 is an elevational view of the four wheeled buggy operated by a seated driver, incorporating the supporting frame according to the present invention. FIG. 2 is an enlarged elevational view of the supporting frame according to the present invention, and FIG. 3 is a plan view of the supporting frame shown in FIG. 2. According to the preferred embodiment of the invention, as shown in FIG. 1, the four wheeled buggy comprises a main frame 1 forming a flat bench comprising a pair of side pipes 1a, a front cross pipe 1b connected to the side pipes 1a at their front ends, and an intermediate cross pipe 1c connected to intermediate portions of the side pipes. Forward portions of the side pipes 1a symmetrically approached each other to form a narrower front portion, behind which a cross pipe 1d is arranged in such a way that both ends of the pipe 1d project laterally from the both sides of the side pipes 1a. A support frame 2 for supporting a steering apparatus is mounted upright on the front part of the main frame 1. A steering apparatus 2b having a steering wheel 2a, a shift-control apparatus 2c and a shock absorber 2d are supported on the supporting frame 2. A flat floor plate fitting portion 3 is provided on the main frame behind the supporting frame 2. On both sides of the floor fitting portion, a pair of L-shaped horizontal step fitting pipes 4 are attached to end portions of the cross pipe 1d and to outer side surface of the side pipes 1a of the main frame 1. A seat fitting frame 5 is arranged on the main frame behind the floor plate fitting portion 3, on which a seat 5a is supported.

According to the present invention, the supporting frame for the driving apparatus comprises an engine supporting frame 7 arranged upright on a rear part of the main frame 1 and extending rearward through a bent portion to which a rear portion of the seat fitting frame 5 is attached, and supported, at its intermediate portion, on an oblique frame 6 connected to a rear surface of the main frame 1, a rear frame 8 removably connected to a rear end of the engine supporting frame 7 and depending therefrom and bent forward at a level substantially equal to a level of the main frame 1, and a lower frame 9 removably connected to a front portion of the rear frame 8 and also removably connected to a lower end of the oblique frame 6. The frames 1, 6, 7, 8 and 9 define and surround a space 10 used to accommodate the driving apparatus. As shown in FIGS. 2 and 3, the engine supporting frame 7 comprises a pair of L-shaped side pipes 7a, a cross pipe 7b for fitting engine brackets, bridged between and connected to upper intermediate portions of the L-shaped pipes 7a, and a cross pipe 7c bridged between and connected to rear portions of the L-shaped pipes 7a. The rear frame 8 comprises a pair of parallel pipes 8a integrally connected to a lower U-shaped portion. (FIG. 3). Upper ends of the pipes 8a are removably connected, by means of bolts 11, to brackets 7d fixed to an intermediate portion of the cross pipe 7c situated at the rear end of the engine supporting frame 7. As shown in FIG. 3, the lower frame 9 comprises a shallow V-shaped member bent symmetrically with respect to a longitudinal center line of the main frame, both ends are provided with coupling plates 12 removably connected, by means of bolts 14, to corresponding brackets 13 fixed to the lower end of the oblique frame 6. A coupling plate 15 fixed to an apex of the V of the lower frame is removably connected, by means of bolts 17, to a coupling plate 16 fixed to a front end (U-shaped portion) of the rear frame 8.

In the supporting structure for driving apparatus, shown in FIG. 1, an engine 20 is supported, at an incline, in a front part of the accommodating space 10 by means of a pair of brackets 21 fixed to inner surfaces of the rear parts of the side pipes of the main frame 1 and a pair of brackets 22 fixed to an intermediate portion of the upper cross pipe 7b of the engine supporting frame 7. In the four wheeled buggy of the present invention, engine 20 is connected to a front-rear drive changing transmission 23 through a stageless speed changing belt converter (not shown); an output of the transmission 23 is connected to an input of a differential gear 24; a crank case 20a of the engine 20, a casing 23a of the transmission 23 and a casing 24a of the differential gear 24 are integrally constructed; and the casing 24a of the differential gear 24 is supported on and fixed to brackets 25 attached to the lower bent portion of the rear frame 8, by means of bolts 26. As shown in FIGS. 2 and 3, on each of branch portions of the V member of the lower frame 9, a pair of brackets 27 are fixedly mounted, on which a corresponding rear swingable arm 28 is mounted in such a way that the arm can swing up and down. Axle tubes 30 for rear wheels 29 are integrally connected to, and supported on, rear ends of the corresponding rear swingable arms 28. Output shafts 31 of the differential gear 24 are connected to the corresponding rear wheels 29 through the corresponding axle tubes 30. Cushions or shock absorbers 32 are provided between the axle tubes 30 and corresponding brackets 33 fixed to the cross pipe 1b of the engine supporting frame 7. A load container 33 is attached to and supported on the engine supporting frame 7.

As can be understood from the above explanation, in accordance with the supporting frame for the four wheeled buggy of the present invention, since the whole driving apparatus, except the rear wheel, is accommodated in the space 10 below the engine supporting frame so that it does not protrude below the vehicle frame, any part of the driving apparatus can not be damaged even when the four wheeled buggy runs on severely irregular land. Further, the rear frame 8 and the lower frame 9 are removable, after the rear frame 8 is removed from the cross pipe 7c of the engine frame 7, the lower frame 9 is removed from the lower end of the oblique frame 6, the engine 20 is detached from the rear part of the main frame 1 and from the cross pipe 7b of the engine supporting frame 7, and the cushions 32 are removed from the cross pipe 7b. Thus, the whole driving apparatus can be detached from the vehicle facilitating maintenance, inspection, and repair of the driving apparatus.

What is claimed is:

1. A supporting frame for a driving apparatus of a four wheeled buggy having a steering wheel operated by a seated driver, comprising:
    an oblique frame connected to a rear surface of a main frame of the buggy;
    an engine supporting frame arranged upright on a rear portion of said main frame and extending rearwardly through a bent portion thereof and supported on said oblique frame;
    a rear frame removably connected to a rear end of said engine supporting frame and depending therefrom and bent forwardly at a level substantially equal to a level of said main frame; and
    a lower frame removably connected to a front end of said rear frame and removably connected to a lower end of said oblique frame;
    wherein said frames define and surround a space used for accommodating the driving apparatus.

2. A supporting frame according to claim 1 further comprising a seat fitting frame connected to said main frame in front of said engine supporting frame, said seat fitting frame being connected to said bent portion of the engine supporting frame.

3. A supporting frame according to claim 1, wherein said engine supporting frame includes a pair of L-shaped side pipes; a cross pipe for fitting engine brackets, bridged between and connected to upper intermediate portions of said L-shaped pipes; and a cross pipe bridged between and connected to rear ends of said L-shaped pipes.

* * * * *